May 18, 1937.  M. FRUDUA  2,080,606
SKINNING APPARATUS
Filed July 20, 1935 2 Sheets-Sheet 1

Inventor:
M. Frudua
By: Glascock Downing & Seebold
Attorneys

May 18, 1937. M. FRUDUA 2,080,606
SKINNING APPARATUS
Filed July 20, 1935 2 Sheets-Sheet 2
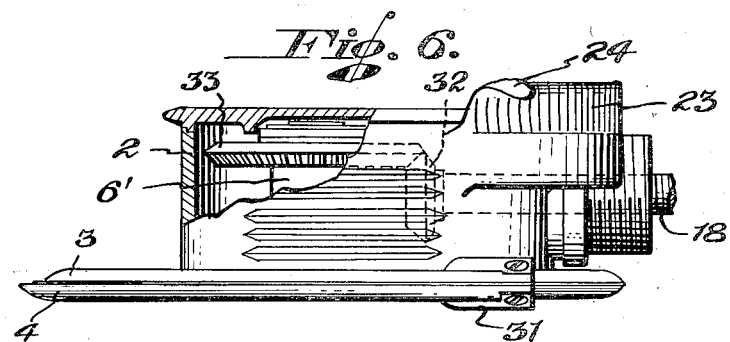
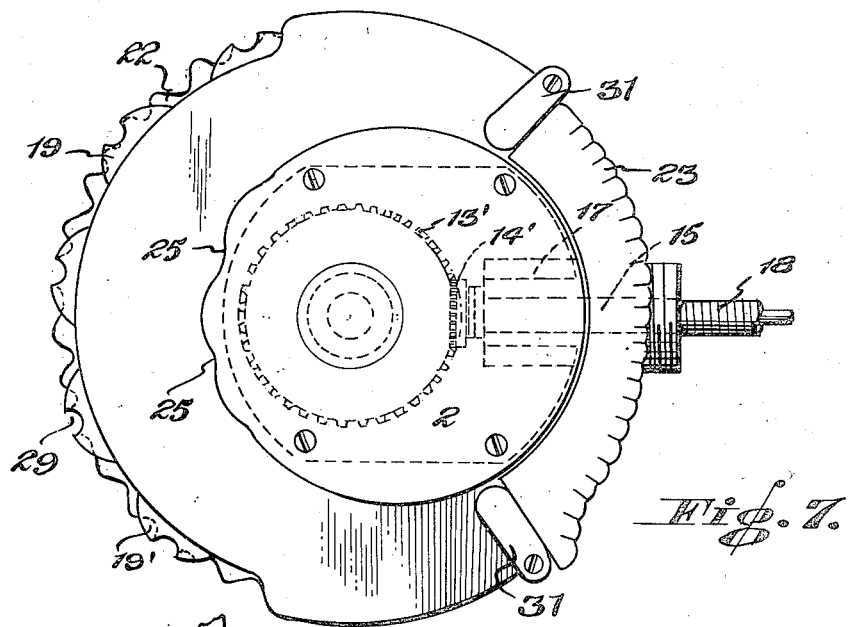
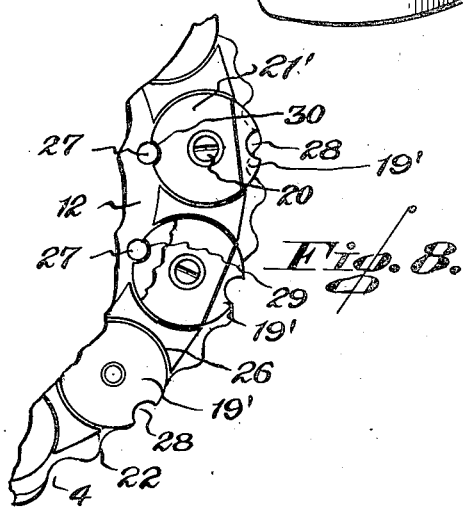
Inventor:
M. Frudua
By Glascock Downing & Seebold
Attorneys Patented May 18, 1937

2,080,606

UNITED STATES PATENT OFFICE 2,080,606

SKINNING APPARATUS

Mario Frudua, Milan, Italy

Application July 20, 1935, Serial No. 32,445
In Italy August 2, 1934

7 Claims. (Cl. 17—22)

The present invention has for its subject-matter a hand-operated mechanical apparatus, fitted with flexible transmission, serving to quickly and perfectly carry out the separation of the skin from the flesh of slaughtered animals. The apparatus, besides completely replacing the use of knives, offers considerable advantages over similar mechanical apparatus heretofore in use; it is for example stronger, lighter, handier and fulfills its specific function in a better and surer manner thanks to its cutting parts, which have been designed according to a novel and rational idea both from the mechanical and scientific standpoint.

The invention also relates to improvements for rendering the grip on the apparatus more practical and the removal and reinsertion of the cutting knives in the form of wheels more rapid; besides, the cutting wheels are so shaped as to form teeth which render the cutting more effective.

The invention, which therefore possesses both utility and novelty, is represented by the accompanying drawings in one of its embodiments.

Figure 1 in the drawings is a plan view of the apparatus seen from the handle side, the rotor carrying the cutting wheels being partly uncovered.

Fig. 6 is a side view of a modified form of the apparatus partly in section.

Fig. 7 is a plan view of Fig. 6; and

Fig. 8 shows a fragmentary detail of the apparatus illustrated in Figs. 6, 7.

Figure 1:
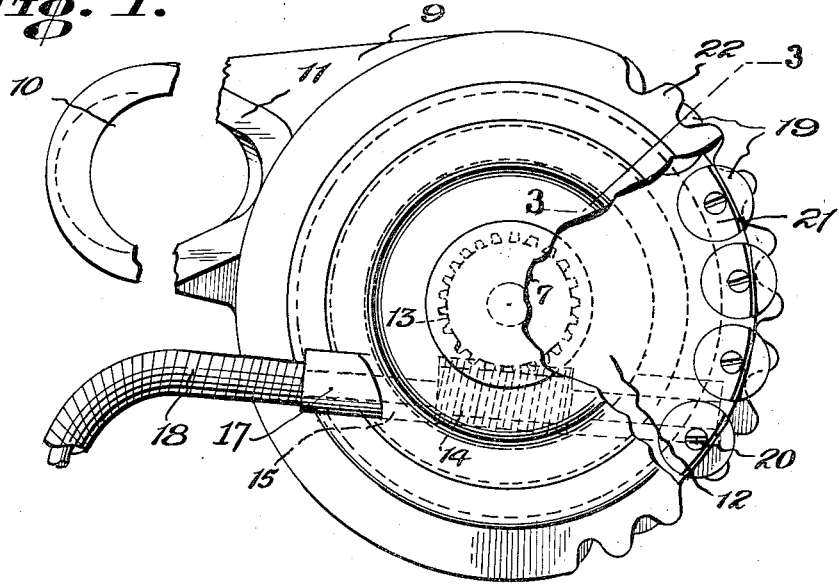
Figure 2:
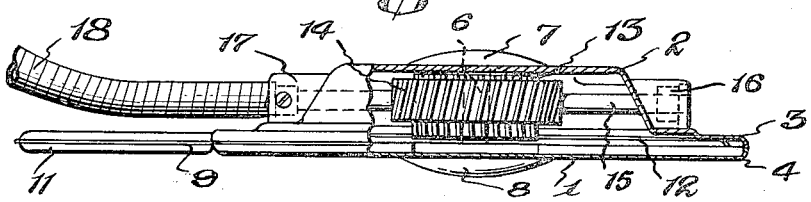
Fig. 2 is a side view of Fig. 1 partly in section.
Figures 3, 4:
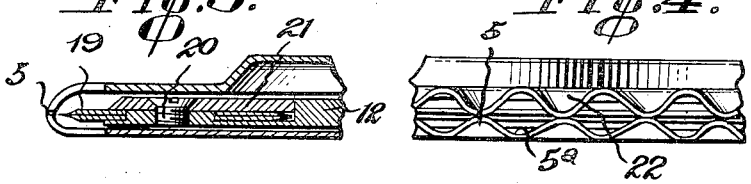
Fig. 3 is a sectional view, drawn to a larger scale, taken along the line 3—3 of Fig. 1, and showing a cutting blade, and blade securing means.
Fig. 4 is an end view, on an enlarged scale, of a few of the cutters and the guard teeth.
Figure 5:
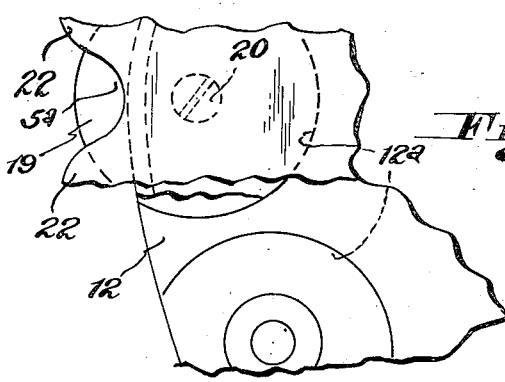
Fig. 5 is a view, on an enlarged scale, showing the arrangement of a cutter and a few guard teeth.

Referring to Figs. 1 to 5, the metallic casing of the apparatus comprises two elements viz. the circular bottom plate 1 and the likewise circular box or top plate 2 provided with pointed edges 3 and 4 respectively and the two edges being accurately superposed and joined by suitable means as contacting lips 5 formed at the edges of plates 1 and 2 and recess 5a (Fig. 3). The two elements are fastened together by a special bolt 6, the head 7 and nut 8 of which are convex and flattened to avoid obstruction in use. The box 2 is fitted with a lug 9 arranged tangentially to the box in a plane normal to the axis of the box (Figs. 1 and 2). In the lug 9, the surface and thickness of which are suitably dimensioned, an opening 10 is provided, having a suitable internal lining 11 and of such a size and shape as to permit the operator to introduce his thumb therein while he stretches his other four fingers along the box periphery in order to firmly grip and guide the apparatus.

The cutting portion of the apparatus comprises a revolving disk 12 fastened on the helical gear wheel 13 which is adapted to loosely revolve about the shank of bolt 6. The helical wheel 13 is driven by the worm 14 secured to the shaft 15 which is supported in bearings 16 and 17 cast in one with the circular box 2 of the casing. The shaft 15 is driven by the flexible transmission 18. In the body of the revolving disk 12 a series of peripheral recesses 12a are formed, each measuring about a three-quarters arc of a circle and being open at the disk edge; in these recesses fit snugly the circular cutters 19, bevelling down to a thin peripheral cutting edge. Each cutter is held in its respective recess by a screw pin 20, the flat head of which is countersunk in a washer 21. This washer is an accurate fit in the recess 12a and has the same contour, so that the outer edge of the washer is flush with the edge of the disk 12 and abuts with its inner edge against the inner surface of the recess 12a of the disk, as clearly shown in Figs. 3 and 5. All cutters are therefore projecting beyond the periphery of the revolving disk and also beyond the washer 21, their amount of projection being equal in all cutters and such that the cutters project substantially level with the edges 3 and 4 formed on the casing facing each other (Figs. 3 and 4). The cutting function of the cutters 19 is assisted by the set of teeth 22, which are all alike and spaced equally apart on the side along an arc of 150° opposite the handle, so that all the projecting portions of the cutters 19 are left uncovered, as may be seen from Figures 4 and 5. The object of said teeth is to guide the cutters between the flesh and the skin of the animal, protecting the cutters and preventing them from damaging the flesh or the skin. The described cutters obviously offer the advantage that they may be turned several times, which permits of utilizing their cutting edge over the whole cutter periphery before the cutters are taken out in order to be sharpened.

Alternatively, referring to the improvements illustrated in Figures 6 to 8, the handle lining 11 is done away with and in its stead a knurled adapter 23 is fitted to the box 2, which in this case is arranged eccentrically relatively to the revolving disc. The adapter 23 has at its left end an extension finger 24, the underside of which is hollowed out for the operator's thumb when he seizes the apparatus. Further, in the forward peripheral portion of the box as at 25, undulations are formed for the other fingers of the operator in order that he may have a firm hold on the box during operation.

The recesses 26 serve as seats for the cutters and may be covered also at their rear by washers 21' where a pin 27 is fixed. The cutters 19' have peripheral indentations at two points 28 and 29 diametrically opposite to each other and so that the said pin 27 accurately fits in one of the indentations 29 while the other indentation 28 forms teeth at the exposed outer side of the cutter 19' serving to cut away the hide. The indentation 29 engages the pin 27 and serves to secure the cutter 19' in place which is then further secured by means of the washer 21'. The washer is held in the revolving disk by the screw 20. In the washer 21' is also provided an indentation 30, the object of which is also to engage the pin 27, which thus serves to prevent the washer from rotating.

With the modified form of the cutters and with the fixing method hereabove described, cutting points of great efficiency are attained and rapid mounting or dismounting of the cutters is accomplished.

The circular plate 1 has lugs 31, by means of which the said plate is secured to the box 2 of the apparatus.

The connection between the flexible transmission 18 and the spindle 6' of the cutter-carrying disk 12 is obtained by means of two bevel gears 32 and 33, one of which is fixed on the shaft 15 of the flexible transmission and the other on the spindle 6' of the revolving disk. The spindle 6' revolves in ball bearings; in this manner the object is achieved of increasing the rotation speed of the revolving disk and lessening at the same time its friction resistance.

The edge 3 of box 2, instead of being provided with teeth, may be plain as represented at the front edge in Fig. 7. In this case the edge 3 may be set back relatively to the teeth of the disk 1, so as to leave the cutting points of the cutters uncovered.

I claim:

1. An apparatus for separating the skin from the flesh of slaughtered animals which is operable by hand and driven by means of a flexible shaft, comprising a two-part casing composed of a substantially circular box and a circular disk, the edges of which are superposed, and interconnected by a central bolt, one of said parts having a projecting flat lug arranged in a plane perpendicular to the axis of said bolt and pierced with an opening into which the thumb of a hand can be introduced while the other four fingers are extended along the outer face of one of the said parts in order to grasp and guide the apparatus.

2. An apparatus according to claim 1, in which the cutting device comprises a set of substantially circular cutters suitably mounted in the box by means of washers and screws in contiguity with the periphery of a revolving disk, a helical wheel integral with said disk and turning freely on the shank of said central bolt, a worm meshing with said helical wheel and a flexible shaft for driving said worm.

3. An apparatus according to claim 1 in which the cutting device comprises a set of substantially circular cutters suitably mounted in the box by means of washers and screws in contiguity with the periphery of said revolving disk, a helical wheel integral with said disk and adapted to turn freely on the shank of said central bolt, a worm meshing with said helical wheel and a flexible shaft for driving said worm; about 150° of the edge of said box opposite said flat lug being provided with a series of indentations and through which all of said cutters project a similar amount beyond the edge of the revolving disk and of said washers, so that the outer edge of each cutter remains uncovered.

4. An apparatus for separating the skin from the flesh of slaughtered animals which is operable by hand and driven by means of a flexible shaft, comprising a two-part casing composed of a substantially circular box and a circular disk, the edges of which are superposed, and interconnected by a central bolt, a cutting device consisting of a set of substantially circular cutters suitably mounted in said box in contiguity with the periphery of said disk, means for revolving said disk with the cutters and other means fitting the hand of the operator for guiding the apparatus.

5. An apparatus according to claim 4 in which said cutters are formed with indentations at diametrically opposite points forming two pairs of teeth, one pair of which is adapted to engage with the fixed portion of said disk to prevent rotation of the cutter, while the other pair of teeth serve as cutting points exposed beyond the edge of said box.

6. An apparatus according to claim 4 in which said other means consist of an adapter with a knurled edge and a thumb-grip thereon, said box having an undulated surface on the cutting side of the apparatus.

7. An apparatus according to claim 4 in which said cutters are formed with indentations at diametrically opposite points forming two pairs of teeth, one pair of which is adapted to engage with the fixed portion of said disk to prevent rotation of the cutter, while the other pair of teeth serve as cutting points exposed beyond the edge of said box, and in which said other means consist of an adapter with a knurled edge and a thumb-grip thereon, said box having an undulated surface on the cutting side of the apparatus.

MARIO FRUDUA.